Oct. 12, 1937.  G. H. CROCKER  2,095,315
AUTOMATIC STOKER
Filed Jan. 30, 1934  7 Sheets-Sheet 1

INVENTOR
George H. Crocker,
BY John D. Myers
ATTORNEY

Oct. 12, 1937.　　　　　G. H. CROCKER　　　　　2,095,315
AUTOMATIC STOKER
Filed Jan. 30, 1934　　　　　7 Sheets-Sheet 3

INVENTOR
George H. Crocker,
BY John W. Myers
ATTORNEY

Oct. 12, 1937.   G. H. CROCKER   2,095,315
AUTOMATIC STOKER
Filed Jan. 30, 1934   7 Sheets-Sheet 4

INVENTOR
George H. Crocker,
BY John W. Myers
ATTORNEY

Oct. 12, 1937. G. H. CROCKER 2,095,315
AUTOMATIC STOKER
Filed Jan. 30, 1934 7 Sheets-Sheet 5

INVENTOR
George H. Crocker,
BY John W. Myers
ATTORNEY

Patented Oct. 12, 1937

2,095,315

UNITED STATES PATENT OFFICE 2,095,315

AUTOMATIC STOKER

George H. Crocker, Philadelphia, Pa., assignor to Newton Supply Company, a corporation of Delaware Application January 30, 1934, Serial No. 709,029

40 Claims. (Cl. 110—45)

The invention relates to an automatic stoker and involves various improvements in the combination and arrangement of the burner, the fuel conveyer, the ash conveyer, the air delivery means, and the power device by means of which the various moving parts are driven. The invention also involves certain improvements in the structure of the burner; in the structure of the conveyer for delivering fuel to the burner; in the means for removing ashes from the burner casing; in the structure of the conveyer for removing ashes away from the burner; in various means for preventing ashes from interfering with proper operation of certain movable parts of the apparatus; in transmission means within the burner casing for delivering power to the various moving parts of the apparatus; in the transmission means for delivering power from external motor mechanism to the power transmission means within the burner casing; in the driving means for the ash conveyer; in means for discontinuing the operation of the various moving parts of the stoker in case of an overload, such as by an obstruction in either the fuel conveyer or the ash conveyer; and in the construction of the burner casing and fire pot for providing a uniform distribution of air to the fuel.

Automatic stokers of the general type to which the invention relates are usually provided with a conveyer for delivering fuel to the burner, a conveyer for removing the ashes discharged from the burner, a blower for producing a forced draft in the burner, and motor mechanism for driving the conveyers and the blower, and it is usual in such apparatus to combine the motor and the blower as a unit for assembly with the other elements of the stoker. One of the primary objects of the present invention is the provision, in such a stoker, of means whereby the horizontal angular relation of the motor or the combined motor and blower may be varied with respect to the fuel conveyer, and the horizontal angular relation of the ash conveyer may be varied with respect to either the fuel conveyer or the combined motor and blower. Another important object of the invention is the provision of a burner casing so constructed that one section thereof may be rotatably adjusted with respect to another section for the purpose of facilitating any desired adjustment of the angular relation of the motor or the unitary motor and blower mechanism with respect to the fuel conveyer.

Another object of the invention is the provision of an improved conveyer for delivering fuel to the burner, so constructed that the outer end thereof may be moved into various positions around the vertical axis of the burner without necessitating the adjustment of other moving parts of the stoker, such as the power mechanism and the ash conveyer. Another important object of the invention is the provision of an ash conveyer for removing ashes discharged from the burner, so constructed that the delivery end thereof may readily be located in such position as may be desired without necessitating any rearrangement or readjustment of other moving parts of the apparatus. A further object of the invention is the provision of improved means for driving the ash conveyer. Still another object of the invention is the provision of improved means for removing from within the burner casing the ashes which fall therein from the fire pot. A further object of the invention is the provision of means for preventing the ashes discharged from the upper edge of the burner from accumulating adjacent to and obstructing the operation of portions of the power transmitting mechanism. A still further object of the invention is the provision of means for preventing ashes from entering the bearing for the inner end of the fuel conveyer shaft.

It is also an important object of the invention to provide improved means for supporting the drive shaft between the motor mechanism and the burner so as to avoid the necessity of alining the bearings for the drive shaft when the parts of the apparatus are assembled. The invention also has for an object the provision of improved power transmission means within the burner casing, so constructed as to permit horizontal angular adjustments of the motor mechanism, the fuel conveyer and the ash conveyer with respect to each other.

It is also an object of the invention to so construct the burner casing and the fire pot as to insure a uniform distribution of draft to the fuel in the fire pot. The invention has for a still further object the provision of adjustable means for regulating the discharge of ashes from the edge of the fire pot to thereby maintain a uniform ash ring and a uniform, central fire ring. Another object of the invention is the provision of improved means for discontinuing the operation of the entire apparatus in case of an overload, such as may result from an unusual obstruction in the fuel conveyer or in the ash conveyer.

Still further objects and advantages of the various improvements will be apparent from the following description, taken with the accompanying drawings wherein.

Figure 1:
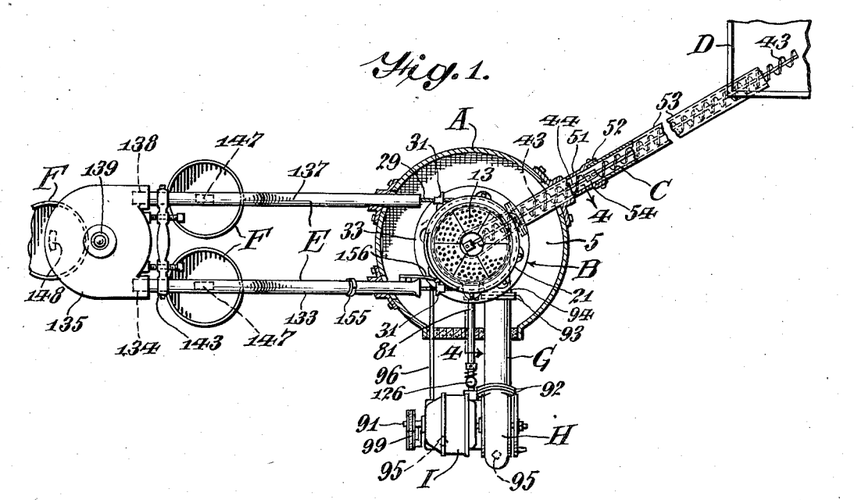
Fig. 1 is a diagrammatic plan view of the improved stoker, showing one horizontal angular arrangement of the combined motor and blower, the fuel conveyer and the ash conveyer.

As illustrated diagrammatically in Fig. 1 of the drawings, the present improvements are shown in their assembled relation with respect to a furnace A, and comprise a burner B mounted in the ash pit of the furnace, a fuel conveyer C for delivering fuel to the burner from a fuel bin D, an ash conveyer E for removing ashes discharged from the burner and depositing them in ash receptacles F, an air delivery pipe G for delivering air to the burner from a blower H, and a motor I combined with and operating the blower and having a driving connection with the stoker through a main drive shaft.

The burner B is so designed as to be readily assembled in pre-existing types of furnaces, and comprises a casing made up of a base section 1 and an upper section which is preferably formed in two parts, an intermediate section 2 supported upon the base section 1 and a top section 3 supported upon the intermediate section. The base section 1 is so designed as to be adjustably supported in some suitable manner, such as by means of a pair of vertically adjustable legs 4, in the ash pit 5 of the furnace A. The upper edge of the base section 1 is provided with an outwardly extending flange 6 for engagement with a corresponding flange 7 on the lower edge of the intermediate section 2, and the intermediate and base sections may be secured together by C-clamps 8 which engage about the outwardly extending flanges 6 and 7. The construction of the base section 1 and the intermediate section 2 is such that the intermediate section may be rotatably adjusted upon the base section, about the axis of the burner, and secured in various positions of adjustment by means of the clamps 8.

As disclosed herein, the wall of the intermediate section 2 tapers inwardly as shown at 9 for the purpose of providing space for parts of the transmission mechanism hereinafter referred to, also for the purpose of uniformly distributing the draft to the fuel in the fire pot as hereinafter described. The upper edge of the intermediate section 2 is turned outwardly to provide a flange 10 upon which an inwardly extending flange 11 on the lower edge of the top section 3 is secured by means of screw bolts 12 as shown in Figs. 2 and 4.

Figure 2:
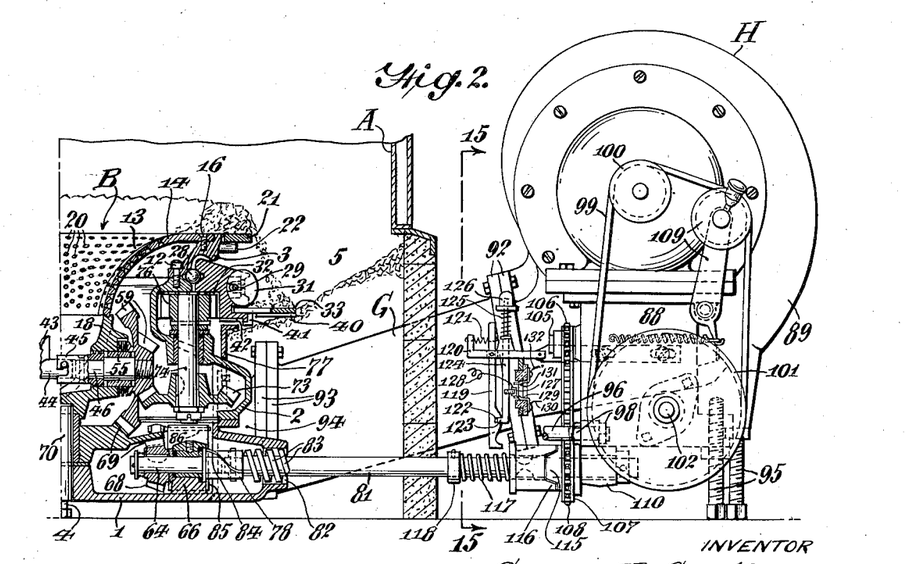
Fig. 2 is an elevational view of the combined motor and blower and the main drive shaft, with the transmission mechanism for delivering power from the main drive shaft to the various moving parts of the stoker shown in vertical section.
Figure 3:
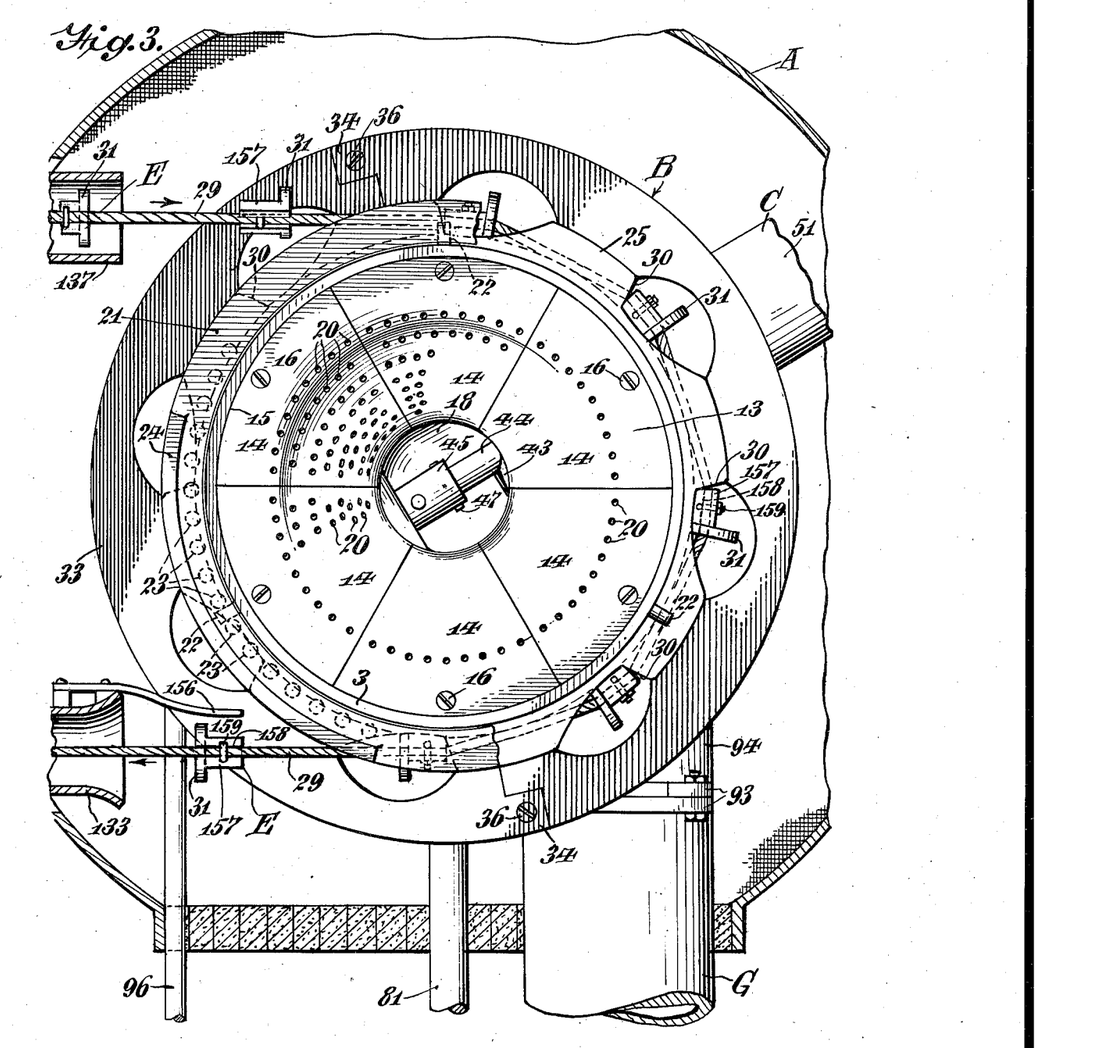
Fig. 3 is a plan view of the burner proper, with certain associated parts shown in section.
Figure 4:
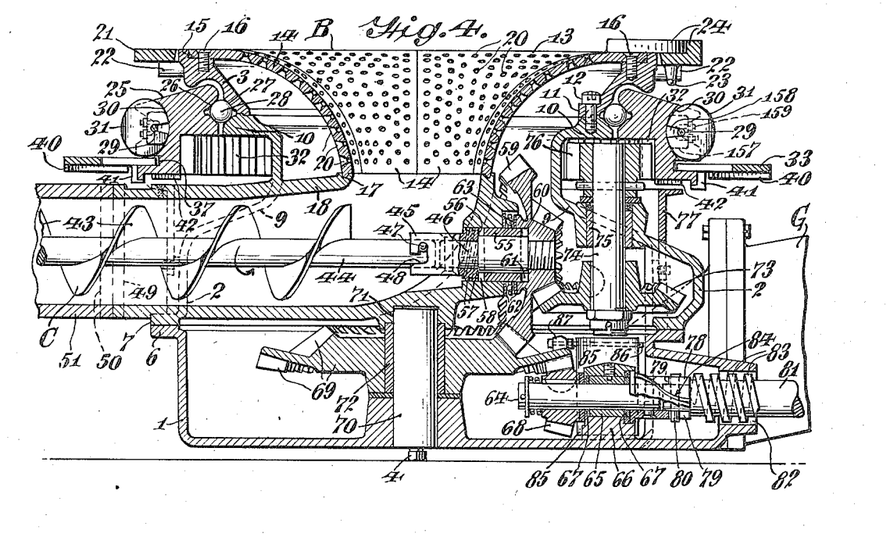
Fig. 4 is a vertical sectional view of the burner, taken on the line 4—4 of Fig. 1.
Figure 5:
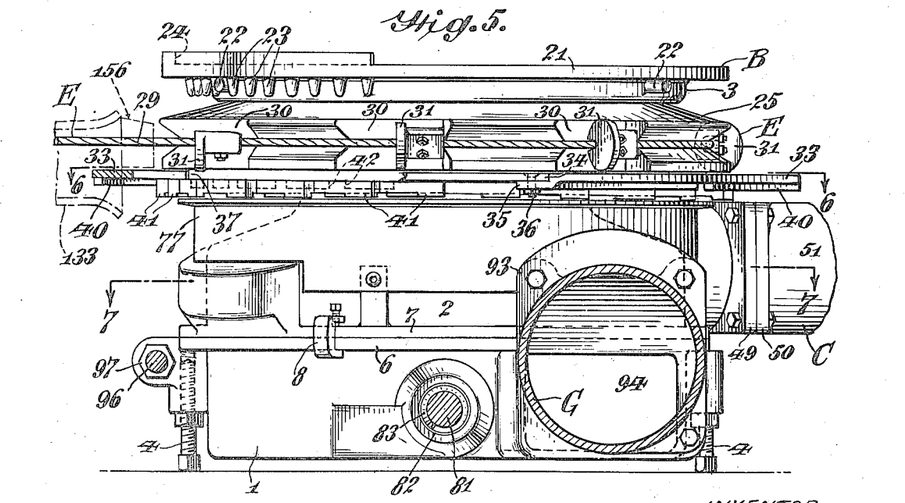
Fig. 5 is an elevational view of the burner shown in Fig. 1.
Figure 6:
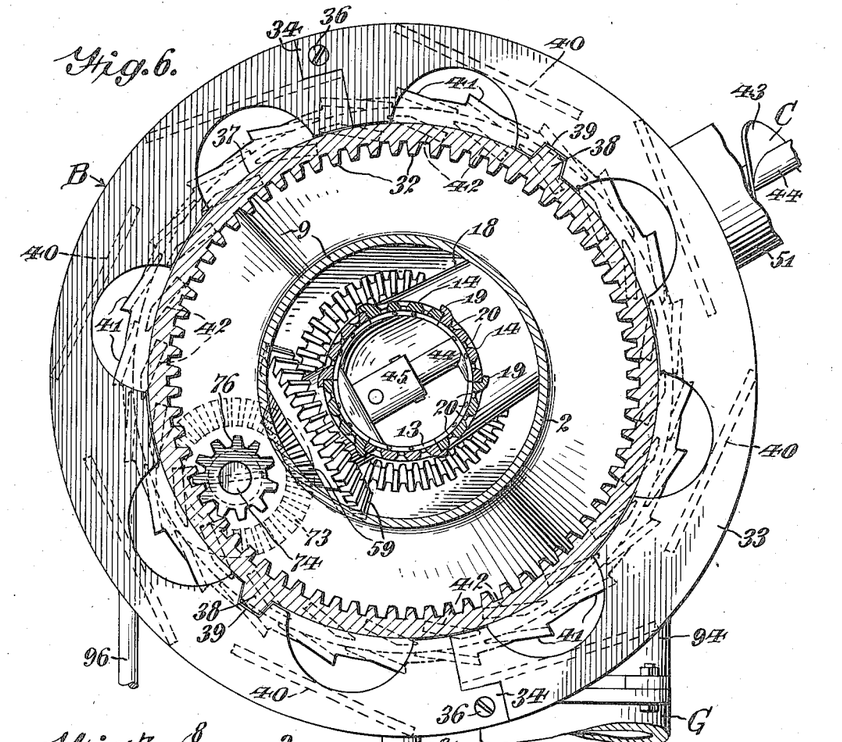
Fig. 6 is a horizontal sectional view through the burner, taken on the line 6—6 of Fig. 5.
Figure 7:
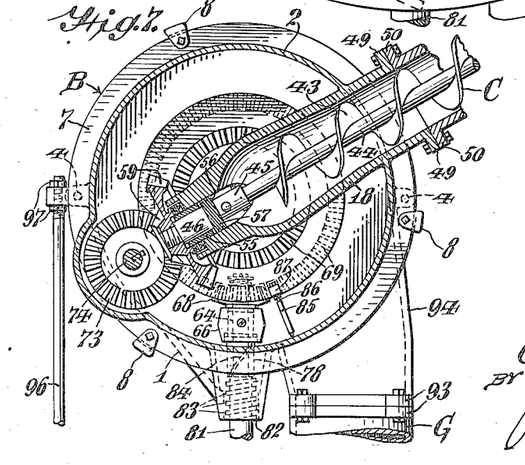
Fig. 7 is a reduced horizontal sectional view through the burner, taken on the line 7—7 of Fig. 5.

As illustrated in Figs. 2, 3 and 4, the fire pot 13 supplants the usual grate when the present stoker is assembled in a pre-existing furnace, and comprises a plurality of downwardly tapering sections 14, curved both longitudinally and transversely, with their upper ends supported in an annular recess 15 in the upper edge of the top burner section 3 and secured therein by means of screws 16. The lower ends of the grate sections 14 are supported in an annular groove 17 in the upturned end of the inner section 18 of the fuel conveyer tube, which is preferably formed integrally with the intermediate section 2 of the burner casing. Preferably one longitudinal edge of each grate section 14 is provided with an offset flange 19 for engagement beneath the edge of the adjacent section, as shown in Fig. 6, for the purpose of reducing air leakage between the sections and in order that the inner faces of the sections may be retained in position and thus maintain a comparatively smooth inner surface for the fire pot. Each of the grate sections 14 is provided with a plurality of small openings 20 through which air is delivered to the fuel in the fire pot and through which a small quantity of fine ashes passes downwardly into the burner casing.

Supported outwardly of the upper edge of the top section 3 of the burner casing is an ash discharge rim 21. This rim is supported by a plurality of spaced pins 22 secured to and extending outwardly from the top section 3. A plurality of annularly spaced pins 23 on the lower face of the ash rim 21 cooperate with the outwardly extending pins 22 to locate the ash rim in various positions of adjustment about the upper edge of the top section as well as the outer edge of the fire pot. Preferably, the outer edge of the ash rim 21 is provided with an upstanding portion 24 for the purpose of regulating the discharge of ashes at localized points around the upper edge of the fire pot and thereby maintain a central, evenly distributed fire ring, it being understood that this ash discharge regulator may be readily moved to any position desired by annular adjustment of the ash rim upon the outwardly extending pins 22.

Mounted for rotation around the upper section of the burner casing is a ring member 25 which serves as means for supporting and driving the movable parts of the ash conveyer E. The inner edge of the upper portion of the ring 25 is provided with an annular groove 26 which cooperates with a similar groove 27 in the outer face of the upper section of the burner casing to provide a race-way for a plurality of balls 28 upon which the ring rotates. As disclosed herein, the portion 27 of the race-way formed in the upper section of the burner casing is provided at the juncture of the top section 3 with the intermediate section 2. The outer edge of the ring 25 is provided with an annular groove to receive the ash conveyer cable 29 hereinafter described, and the outer edge of the ring is cut away at intervals to provide recesses 30 for spaced scrapers 31 secured to the cable 29. The inner portion of the lower edge of the ring 25 is provided with an internal gear 32 whereby the ring may be driven by means of the transmission mechanism hereinafter described.

A circular ash conveyer plate 33, preferably made in two sections having offset overlapping end portions 34, 35 secured together by means of bolts 36, has its inner edge supported within a recess 37 in the outer edge of the ring 25 below the conveyer cable 29 and the scrapers 31 carried thereby. In order that the ash conveyer plate 33 may be secured against relative rotation with respect to the ring 25, the ring may be provided with outwardly projecting lugs 38 for engagement within notches 39 in the inner edge of the plate. The lower face of the ash plate 33 is provided with downwardly projecting scrapers 40 so inclined as to push outwardly the ashes which collect immediately beneath the plate. The lower edge of the ring 25 may also be provided with downwardly projecting scraper ribs 41, 42 for the purpose of pushing outwardly ashes which collect beneath the ring and thereby preventing their entrance into the internal gear 32 and obstructing the operation thereof. The ashes which are thus pushed outwardly displace ashes in the top of the pile of ashes in the ash pit, and the displaced ashes roll downwardly onto the ash plate 33 and, together with ashes falling directly upon the plate from the fire pot, are carried along thereby to the fixed scraper hereinafter described.

As shown in Figs. 1, 4, 6 and 7, fuel is delivered to the burner by means of the fuel conveyer C comprising a conveyer pipe and a screw conveyer 43 carried by a shaft 44 the inner end of which is removably connected to a collar 45 on a stub shaft 46 by the engagement of the oppositely arranged ends of a pin 47 with bayonet slots 48 in one end of the collar. As heretofore described, the inner section 18 of the fuel conveyer pipe is formed integrally with the intermediate section of the burner casing, and is provided with outwardly extending flanges 49 which are bolted to similar flanges 50 on the adjacent end of a conveyer pipe section 51 extending outwardly through a suitable opening in the furnace wall. Preferably the fuel conveyer pipe is so constructed as to be separable outside the furnace wall, as shown at 52, in order that a conveyer pipe section 53 of such length as may be desired to connect with the fuel pin D may be employed. It is also preferable to provide a separable joint in the screw conveyer 43 and the shaft 44 thereof as shown at 54 in order that the necessary length of the screw conveyer may be provided.

The stub shaft 46 by which motion is transmitted to the conveyer shaft 44 is supported in a bearing bushing 55 secured in the wall of the upturned end of the conveyer tube section 18. One end of bushing 55 is spaced from a flange 56 on the end of collar 45 and provided with threads 57 of such pitch as to feed small particles of coal or other material away from bushing 55, and from the space 58 between the flange 56 and the bushing, which recess also guards against entrance of such material into the bearing. The inner end of stub shaft 46 is threaded into the hub of a double bevel gear 59. The hub of this gear is provided with a recess 60 into which bushing 55 extends to such a distance as to provide a space 61 for the free passage of fine ashes or other material which may work into the recess and injure the bearing surfaces. A pair of spaced bearing rings 62 serves as a race-way for a set of thrust ball bearings mounted in a ball retainer 63 between the hub of the bevel gear 59 and the wall of the conveyer tube section 18. One of the rings 62 is pinned to the hub of bevel gear 59 and the other is free to rotate on bushing 55.

Power is transmitted to the shaft 44 of the fuel conveyer and to the rotatable ring 25 from a stub drive shaft 64 supported in a bearing bushing 65 secured in a bearing member 66 projecting upwardly from the bottom wall of the base section 1 of the burner casing. Washers 67 of felt or other suitable material surround the stub shaft 64 at each end of bushing 65 to exclude ashes from this bearing. Loosely keyed on the inner end of stub shaft 64, between a coiled spring and a thrust bearing washer, is a bevel gear 68 the teeth of which mesh with corresponding teeth on the lower face of a double bevel gear 69 rotatably mounted about the vertical axis of the burner upon a bearing shaft 70 having its lower end fixedly supported from the bottom wall of the base section of the burner casing and its upper end engaging within a bearing recess 71 in the lower wall of the inner section 18 of the fuel conveyer tube. The upper end of a bearing bushing 72 in bevel gear 69 projects into a counter-bore surrounding recess 71 to prevent entrance of ashes into the bearing.

The teeth on the upper face of the double bevel gear 69 mesh with the teeth on the edge of the double bevel gear 59 on the inner end of the stub shaft 46 through which motion is transmitted to the fuel conveyer. The teeth immediately surrounding the hub of the double bevel gear 59 mesh with corresponding teeth on the upper face of a bevel gear 73 keyed to the lower end of a stub shaft 74 supported in a bearing bushing 75 in the inclined wall 9 of the intermediate section of the burner casing, as shown in Figs. 2 and 4. The upper end of the stub shaft 74 has secured thereon a spur gear 76 the teeth of which mesh with the teeth of the internal gear 32 formed in the ash conveyer driving ring 25 heretofore described. An annular shield 77 secured around the intermediate section of the burner casing with its upper edge positioned adjacent the ring 25 serves to enclose the internal gear 32, the spur gear 76, and the bearing for the stub shaft 74, and this shield, together with scraper ribs 40, 41 and 42, excludes ashes and prevents them from interfering with the operation of these parts.

Secured on the outer end of the stub drive shaft 64 is a collar 78 provided with oppositely arranged longitudinal slots 79 for the reception of the ends of a pin 80 secured in the adjacent end of the main drive shaft 81. The main drive shaft projects through an opening 82 in the side wall of the base section of the burner casing, and that part of the main drive shaft which extends through this opening is provided with spiral threads 83 for the purpose of conveying outwardly into the ash pit 5 ashes which fall downwardly into the burner casing from the fire pot.

The collar 78 is preferably provided with one or more spiral scrapers 84 for the purpose of moving ashes away from the bearing for the stub drive shaft and feeding them to the spiral threads 83 on the main drive shaft.

In order that the ashes discharged through the openings 20 in the fire pot and falling to the bottom of the burner casing may be transported into a position to be removed from the burner casing by the spiral scraper 84 and the screw conveyer 83, a scraper plate 85 is pivotally mounted at its upper edge upon a rod 86 one end of which is secured in a lug 87 on the upper face of the double bevel gear 69. As this double bevel gear rotates about the axis of the burner, the scraper plate 85 is carried therewith in a circular path around the bottom of the burner casing, and it is of sufficient weight to drag ashes and deliver them to the spiral scraper 84 and the short screw conveyer 83 on the main drive shaft. The structure and arrangement of the pivoted scraper plate 85 is such that the lower edge thereof is dragged over the bearing member 66, the plate being thereby swung upon its pivot to dump the ashes in a position to be discharged through the opening 82.

Figures 15, 16, 17, 18:
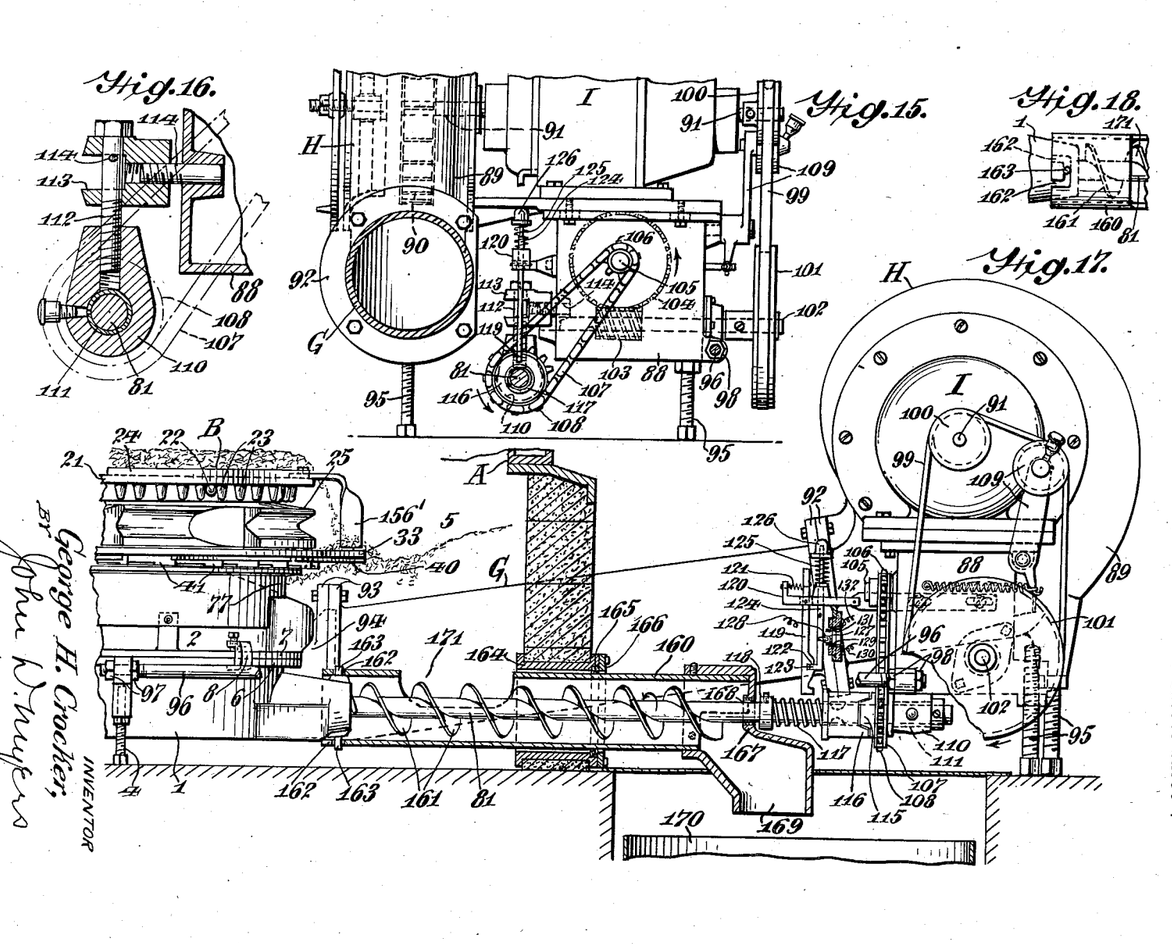
Fig. 15 is a transverse sectional view taken on the line 15—15 of Fig. 2 and showing the combined motor and blower mechanism in elevation.
Fig. 16 is a detailed view of the support for the bearing in which the end of the main drive shaft adjacent the motor is mounted.
Fig. 17 is an elevational view of a portion of the burner and the combined motor and blower mechanism, showing a modified form of ash conveyer in vertical longitudinal sectional view.
Fig. 18 is a detailed view showing the manner in which the ash conveyer tube of the modified form of apparatus shown in Fig. 17 is connected to the burner casing.

The electric motor I is preferably combined with the blower H and the gear box 88 to form a unitary motor-blower-gear box mechanism, the motor being supported upon a bracket attached to the blower casing 89 and forming a cover for the gear box 88 and having the fan 90 secured directly on an extension of its shaft 91. The air delivery pipe G extending from the blower H to the burner has one end thereof rigidly secured to the blower casing 89 by means of bolts passing through co-operating flanges 92 and its opposite end rigidly secured by bolts and cooperating flanges 93 to an inlet 94 in the base section of the burner casing. The motor-blower-gear box unit is preferably supported upon a pair of adjustable legs 95, one of which is in threaded engagement with the gear box 88 and the other in threaded engagement with the blower casing 89, as shown in Figs. 2, 15 and 17. It will be noted, therefore, that the motor-blower-gear box unit is rigidly connected to the burner when the stoker is assembled and that the adjustable legs 4 and 95 on the burner and the motor-blower-gear box unit provide a ready means for leveling these elements. A stay rod 96 having an adjustable lock nut connection with both the base section of the burner casing and the gear box 88, as shown at 97 and 98, respectively, furnishes additional means for rigidly connecting the motor-blower-gear box unit to the burner.

Power is transmitted by the motor I through a belt 99 passing over a driving pulley 100 on the motor shaft 91 and a pulley 101 on the outer end of a shaft 102 supported in the gear box and having a worm gear 103 thereon meshing with a worm wheel 104 secured on a shaft 105 supported in the gear box transversely of the shaft 102. The outer end of the shaft 105 has secured thereto a small sprocket wheel 106 for driving a sprocket chain 107 which drives a sprocket wheel 108 loosely mounted on the main drive shaft 81. The belt 99 may be provided with a tensioning device 109 of usual construction.

As shown in detail in Fig. 16, the end of the main drive shaft 81 adjacent the motor mechanism is supported in a universal bearing suspended from the gear box 88. This bearing comprises a bearing member 110 having a bushing 111 therein with which the main drive shaft is in bearing engagement. The bearing member 110 is threaded on the lower end of a suspension bolt 112 the upper end of which passes through a swivel 113 and is prevented from rotating therein by means of a cotter pin or other suitable means. The swivel 113 is threaded on the outer end of a horizontal pin 114 secured to the wall of the gear box. By means of these threaded connections, bearing member 110 may be adjusted vertically or horizontally into substantial alinement with stub drive shaft 64. Further horizontal alinement may be obtained by moving gear box 88 relatively to the motor bracket, the gear box being secured to the bracket by a bolt and slot connection as shown in Fig. 15.

The opposite end of the main drive shaft 81 preferably fits somewhat loosely in the collar 78 on the stub drive shaft, thus providing a flexible connection so that the end of the main drive shaft adjacent the motor mechanism may be moved transversely in any direction in order to accord with the relative position of the bearing member 110 with respect to the stub drive shaft 64 when the motor-blower-gear box unit is rigidly connected to the burner casing. This flexible joint together with the universal and adjustable support for the bearing member 110 and the horizontal adjustment of the gear box permits the bearing member 110 to be adjusted into and to assume a permanent position of alinement with the drive shaft 81 when the motor-blower-gear box unit and the burner are assembled, without necessitating expensive machining and assembling operations to secure alinement of the bearings by which the main drive shaft 81 and the stub drive shaft 64 are supported.

An overload clutch element 115 is provided on the hub of the sprocket wheel 108 for cooperation with a corresponding clutch element 116 keyed to the main drive shaft against rotational movement with respect thereto but permitting longitudinal movement thereon. These clutch elements are normally retained in engagement by means of a coiled spring 117 surrounding the main drive shaft between the clutch element 116 and an adjustable collar 118.

In case of an overload upon any part of the stoker, such as may result from an abnormal obstruction of the operation of the fuel feed screw or the ash conveyer, the cooperating cam faces of the clutch elements 115 and 116 force the clutch element 116 to the left, as shown in Figs. 2 and 17, thereby compressing the coiled spring 117 and moving element 116 into engagement with the lower end of a trigger 119 pivoted near its upper end to a stationary support 120 adjustably secured to the gear box 88. A small coiled spring 121 extending between the outer end of the support 120 and the upper end of the trigger 119 tends to maintain the lower end of the trigger in a position where a suitable notch 122 therein is normally in engagement with a lateral projection 123 on the lower end of a switch operating member 124 mounted for sliding movement in an opening in the support 120. A coiled spring 125 surrounding the switch operating member 124 between a manipulating cap 126 on the upper end thereof and the support 120 tends to move the switch operating member 124 upwardly when released by the trigger 119.

The switch operating member 124 carries a contact 127 to which a terminal 128 of the power circuit is connected. When the switch operating member 124 is in its lowermost position, as shown in the various figures of the drawings, the contact 127 is in engagement with a contact 129 to which a terminal 130 of the motor circuit is connected. When the switch operating member 124 is released by actuation of the clutch element 116 into engagement with the trigger 119, the contact member 127 is moved upwardly out of engagement with the lower contact 129 and into engagement with an upper contact 131 to which the terminal 132 of an alarm circuit may be connected. It will be apparent, therefore, that an overload upon any of the moving parts of the stoker sufficient to operate the clutch element 116 and compress the coiled spring 117 will break the motor circuit and thereby discontinue the operation of the entire mechanism. The signal means serves as warning of the obstruction in the stoker, and when the obstruction has been removed the mechanism may again be started by manually moving the switch operating member 124 downwardly until the projection 123 thereon engages with the notch 122 in the trigger 119.

Figure 8:
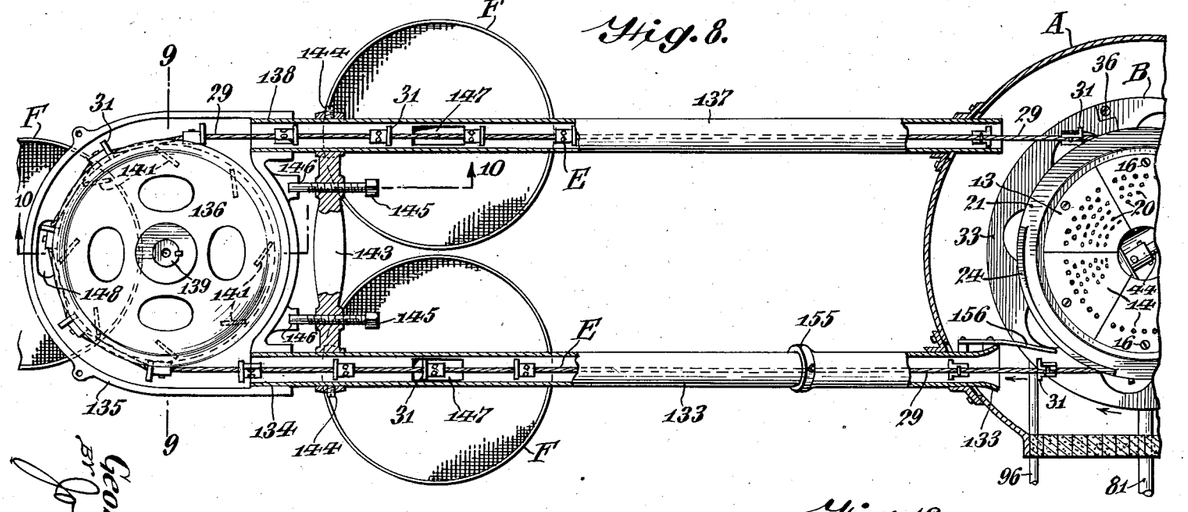
Fig. 8 is a plan view, partly in section, of the ash conveyer shown in Fig. 1, the ash receptacles being shown in position therewith.
Figure 9:
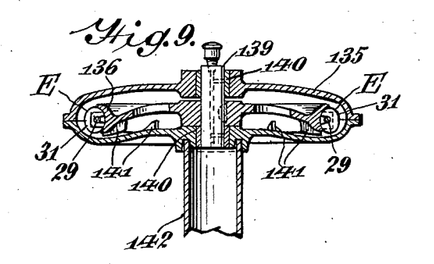
Fig. 9 is a vertical sectional view of the sheave for supporting the outer end of the ash conveyer, taken on the line 9—9 of Fig. 8.
Figure 10:
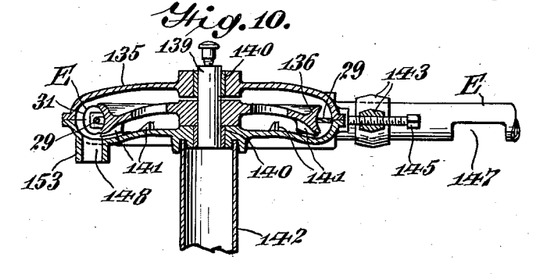
Fig. 10 is a similar view taken on the line 10—10 of Fig. 8.
Figure 11:
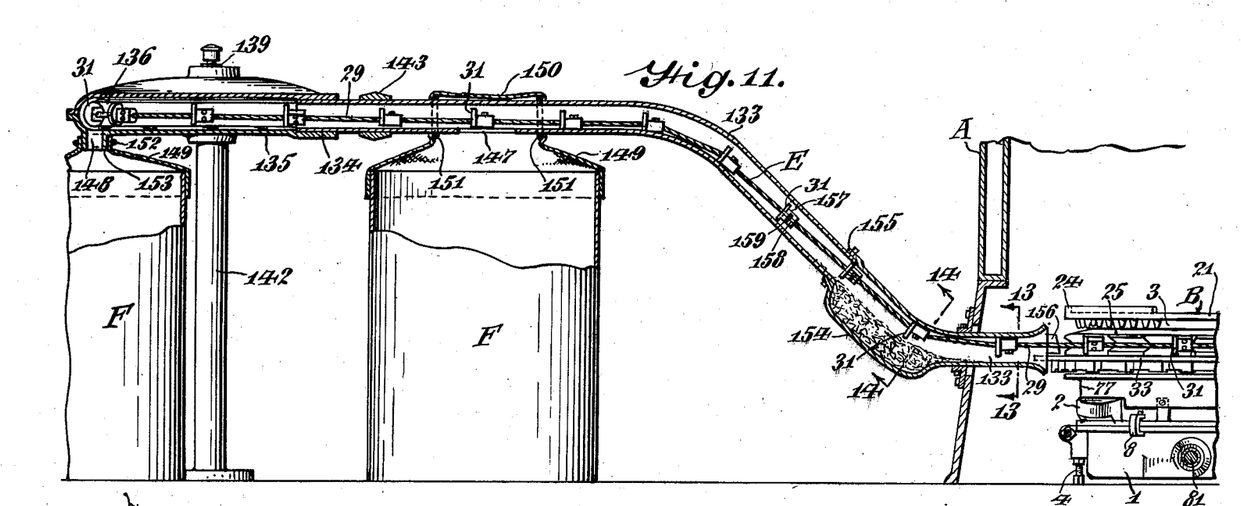
Fig. 11 is a vertical longitudinal sectional view of the ash conveyer shown in Figs. 1 and 8.

As shown in Figs. 1, 8 and 11, the ashes discharged into the ash pit 5 are carried outwardly therefrom by the scraper plates 31 on the conveyer cable 29 the outwardly moving run of which passes through an ash conveyer tube 133. The receiving end of the tube 133 is secured in an opening in the wall of the ash pit and extends inwardly to a point in horizontal alinement with the driving ring 25 and adjacent the ash conveyer plate 33. The outer end of the ash conveyer tube 133 is slidably mounted in an elongated socket 134 in a housing 135 for a sheave 136 about which the conveyer cable 29 passes into a return conveyer tube 137. The outer end of the return tube 137 is also slidably mounted in an elongated socket 138 in the sheave housing 135 and its inner end is secured in the wall of the ash pit in alinement with the driving ring 25.

The sheave 136 is secured on a short spindle 139 having the opposite ends thereof mounted in bearing bushings 140 in the walls of the sheave housing. The lower face of the sheave 136 is preferably provided with an annular series of scraper blades or teeth 141 so inclined as to feed outwardly away from the sheave bearings any ashes which may be carried into the housing. As disclosed herein, the sheave housing 135 may be supported on a pedestal 142. The outer ends of the ash conveyer tube 133 and the return tube 137 extend through openings in the ends of a tie rod 143 and may be retained in any adjusted position by means of set screws 144 as shown in Fig. 8. Adjusting screws 145 in threaded engagement with the tie rod 143 have their free ends in contact with suitable sockets 146 on the sheave housing in order that the sheave may be adjusted longitudinally with respect to the ash conveyer tubes to provide the necessary tension in, and to take up any stretch of the cable 29.

Figure 12:
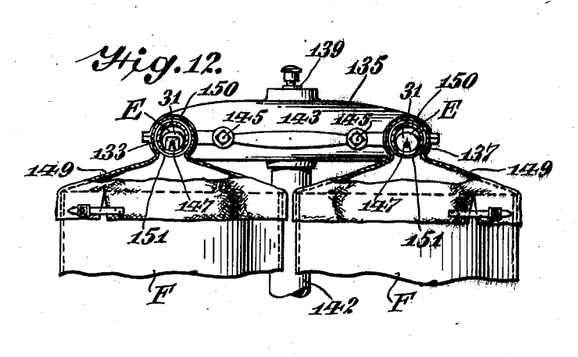
Fig. 12 is a detailed view showing the manner in which the ash receptacles are removably connected to the ash conveyer tubes.

Suitable openings 147 are provided in the ash conveyer tubes for the discharge of ashes therethrough into the receptacles F, and an ash discharge opening 148 may also be provided in the lower wall of the sheave housing adjacent the outer edge of the sheave. Fabric covers 149 may be detachably secured on the receptacles F as shown in Fig. 12. The covers for the receptacles beneath the openings 147 in the ash conveyer tubes have a folded portion 150 thereof surrounding the tubes and provided with wear-resisting rings 151. The cover 149 for the receptacle beneath the sheave housing may be secured about the opening 148 in some suitable manner, such as by the engagement of a portion of the cover between a ring 152 and the flange 153 surrounding the opening.

As shown in Fig. 11 of the drawings, it is preferable to incline the ash conveyer tubes upwardly to such a height as may be required by the ash receptacles utilized with the conveyer. A pocket 154 is formed in the ash conveyer tube 133 at the lower end of the upwardly inclined run, as shown in Fig. 11, for the reception of cinders of such a size as might obstruct the operation of the ash conveyer by wedging between one of the scraper plates 31 and the wall of the tube. The tendency of ashes and cinders to gravitate down such an inclined run makes it desirable that such a pocket be located in this manner. When the stoker is in use, the pocket 154 immediately fills with ashes and these ashes form a cushion for cinders of abnormal size or shape, so that any such cinders are pressed down into the ash cushion and are gradually disintegrated by the passage of the scrapers thereover. The ash conveyer tube 133 may be provided with a separable joint 155 adjacent the pocket 154, as shown in Figs. 8 and 11, in order that the tube may be taken apart so that unusual obstructions may be removed from the pocket.

It is desirable that a fixed scraper 156 be supported in some suitable manner adjacent the inlet end of the ash conveyer tube 133 for the purpose of removing ashes from the ash conveyer plate 33. As illustrated in Figs. 1 and 8, the scraper 156 is secured to the adjacent end of the ash conveyer tube 133, although it will be understood that it may be secured to such other stationary part of the apparatus or furnace as may be desired.

Figure 13:
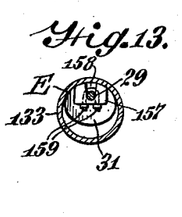
Figs. 13 and 14 are detailed sectional views through the ash conveyer, taken on the lines 13—13 and 14—14, respectively, of Fig. 11.
Figure 14:
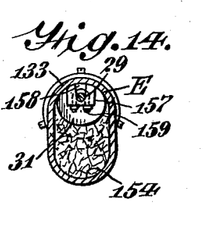

The ash conveyer tubes 133 and 137 are preferably circular in cross section, and the scraper plates 31 on the conveyer cable 29 are preferably oval in shape so as to avoid as much as possible any likelihood of cinders or clinkers interfering with the movement of the plates through the tubes. Each plate has a hub 157 projecting from one face thereof, and the cable engages within a recess 158 extending lengthwise of the hub and through one edge of the plate, and is secured therein by means of a U-shaped clamping bolt 159 as shown in Figs. 13 and 14.

In the modified form of stoker shown in Fig. 17, ashes are removed from the ash pit through a tube 160 surrounding the main drive shaft 81, by means of a screw conveyer 161 on the main drive shaft. The inner end of this tube fits loosely around the ash discharge opening 82 and is provided with oppositely arranged bayonet slots 162 for engagement with pins 163 extending outwardly from the ash discharge opening. This construction provides an inexpensive and flexible means for securing the ash tube 160 to the burner casing so that it may be easily disconnected and removed from outside the furnace. The tube 160 extends through a flanged sleeve 164 in the brick wall closing the ash pit opening. The sleeve 164 is recessed at its outer end to receive a washer 165 of asbestos or other suitable material held in position by a cover plate 166, and is designed to provide an air and dust-tight joint, at the same time permitting slight movement of the tube 160. The opposite end of the tube 160 is provided with a closure cap 167 having a loose fitting bearing 168 on the main drive shaft and a discharge spout 169 extending therefrom in order that the ashes may be deposited in a suitable receptacle 170, preferably positioned in a pit below the floor level. The flexible mounting of the ash tube 160 at both ends, combined with the flexibility of the main drive shaft as heretofore described, permits these parts to adjust themselves to strains and stresses produced by clinkers between the ash screw 161 and ash tube 160, with much less wear and tear as compared to the usual rigid construction.

With this form of ash conveyer, an opening 171 in the conveyer tube 160 receives the ashes as they gravitate downwardly thereto in the ash pit 5. In this case it is preferable to secure the fixed scraper 156' to a stationary part of the furnace or stoker, such as the ash rim 21, at a point vertically above the tube 160. It will be understood that it is unnecessary to use with this form of the device the ash conveyer shown in Figs. 1, 8 and 11 and heretofore dscribed. With this form it will be noted that the ashes falling downwardly into the burner casing from the fire pot are delivered outwardly by the spiral scraper 84 and the short screw conveyer 83 on the main drive shaft into the ash conveyer tube 160, so that both the ashes from within the burner casing and those discharged over the upper edge thereof are removed through the ash conveyer tube 160.

In assembling the present stoker the base section 1 of the burner casing is preferably so positioned in the ash pit 5 of the furnace that the main drive shaft 81 and the air delivery pipe G extend through the ash removal opening of the pit, a wall of brick or other suitable material replacing the usual closure therefor, as shown in Figs. 2 and 17. Inasmuch as the air delivery pipe G is rigidly connected to both the motor-blower-gear box unit and the base section of the burner casing, this assembly determines the location of the motor-blower-gear box unit with respect to the furnace and the furnace room in which the stoker is to be used.

The intermediate section 2 of the burner casing is then assembled on the base section so as to direct the fuel conveyer C toward the fuel bin D, it being understood from the above description that the fuel conveyer may be arranged in any desired horizontal angular relation with respect to the assembled motor-blower-gear box unit and base section of the burner. By reason of the fact that the ash conveyer cable 29 illustrated in Figs. 1 to 16 is driven by the ring 25, the outer end of the ash conveyer may likewise be located at any convenient point in the furnace room by providing suitably located openings in the furnace wall and securing the ash conveyer tubes 133 and 137 therein.

With such a structure, it will be apparent that either the fuel conveyer or the ash conveyer may be easily positioned in any horizontal angular relation with respect to each other about the vertical axis of the stoker, or in any desired horizontal angular relation with respect to the motor-blower mechanism, without necessitating any rearrangement or adjustment of other parts of the apparatus. In other words, when the motor-blower mechanism has been connected to the base section of the burner in the installation of the stoker, the fuel conveyer may be swung around the vertical axis of the burner into any position that may be desired, and the ash conveyer may likewise be swung into any desired position around the vertical axis of the burner, these parts being secured in position when located as desired with respect to each other.

In the operation of the stoker, fuel such as coal is fed inwardly by the screw conveyer 43 and forced upwardly through the opening in the bottom of the fire pot. As the fuel moves upwardly in the fire pot, air is delivered thereto from the blower through the air delivery pipe G opening into the base section of the burner casing. The inwardly tapering wall 9 of the intermediate burner section is so designed as to form a restricted opening between the lower portion of the burner casing and the upper portion thereof of such a size as to throttle the draft delivered to the lower part of the burner casing by the blower. With such a restriction air is delivered uniformly to the space surrounding the fire pot to thereby avoid an unequal draft at various points around the fire pot or grate as frequently results with forced draft stokers when air is delivered to the lower portion of the burner casing and is not properly throttled or directed in its passage upwardly to the fuel.

In order to properly throttle the draft, it is preferable that the area of the restricted passageway be streamlined and smaller than the area of the air inlet into the base section from the air delivery tube so that the lower portion of the casing becomes, in effect, a storage chamber for slow-moving and comparatively currentless air. As the air emerges from the restricted passageway it expands uniformly and completely fills the chamber immediately beneath the grate, thereby being distributed uniformly to the grate and producing a uniform draft through the openings 20.

With fuel feeding means of the type herein disclosed, fuel may tend to feed more rapidly up the side of the fire pot opposite the fuel delivery side. The ash discharge regulator 24 may be positioned around the burner at any point desired by merely adjusting the ash rim 21 around the upper edge of the burner. By positioning the regulator at any point where unburned fuel is being discharged, the feed upwardly toward that point is thereby retarded thus permitting the fuel to be completely burned before it is discharged with the ashes, and producing a uniform ash ring and a central fire ring.

As the fuel is forced upwardly through the fire pot by the fuel conveyer, ashes are discharged outwardly over the ash rim 21 and fall downwardly upon the ash conveyer plate 33. Inasmuch as the ash conveyer plate is continuously rotated, the ashes falling thereon are carried along with the plate to a point adjacent the ash conveyer tube 133 where they are removed by the scraper 156. It will be understood, of course, that ashes collect in the ash pit not only beneath the fixed scraper 156 but throughout the entire circumference of the pit, and the topmost ashes so accumulating are eventually carried on the rotating ash plate 33 to the fixed scraper where they are discharged and dragged outwardly, through the ash conveyer tube 133 by the scrapers 31 on the cable 29.

The ashes carried outwardly through the ash conveyer tube 133 are discharged through the opening 147 into the first of the ash receptacles F until the receptacle is filled to the level of the tube, whereupon they are carried through the tube beyond the first receptacle and deposited in the receptacle F under the opening 148 in the sheave housing 135. When this receptacle is filled the ashes are then dragged around the sheave and into the return conveyer tube 137 to the opening 147 therein and discharged into the receptacle thereunder. With an ash conveyer of this type, it will be apparent that any number of receptacles, except as limited by space and motor power, may be utilized, thus providing large ash storage capacity and avoiding the necessity of emptying the receptacles at frequent intervals, and it will also be apparent that no mechanism, other than what is required for lengthening the conveyer, is needed to transfer the delivery of ashes from one receptacle to the next as successive receptacles are filled.

As hereinbefore pointed out, a small quantity of fine ashes sifts through the openings 20 in the fire pot and falls to the bottom of the burner casing whereupon they are dragged by the pivoted scraper 85 and dumped adjacent the ash discharge opening 82 as the scraper moves over the bearing member 66. These siftings are then fed outwardly through the discharge opening by the spiral scraper 84 and the short screw conveyer 83 on the main drive shaft and thereby delivered to the bed of ashes in the ash pit 5 from the top of which ashes are continually removed by the action of the rotating conveyer plate in carrying the ashes to the fixed scraper whence they are removed by the scrapers 31 on the cable 29.

With the form of ash conveyer shown in Figs. 17 and 18, the siftings from within the burner casing are delivered to the screw conveyer 161 on the main drive shaft and are carried forwardly in the conveyer tube 160 and discharged through the spout 169 along with the ashes which gravitate downwardly in the ash pit into the opening 171 in this tube.

While certain structural forms of the important features of the stoker have been disclosed herein, together with the preferred arrangement of the various parts of the stoker with respect to one another, it is to be understood that the invention is not intended to be limited to the precise structure and arrangement of parts as shown and described. The above description and the accompanying drawings are therefore to be regarded as illustrative only of the form and arrangement of the various elements of the apparatus, and it is to be understood that the invention is susceptible of other forms and arrangements so long as they come within the scope of the appended claims.

The invention herein disclosed is particularly defined by the following claims:

1. In an automatic stoker, a fire pot, means for feeding fuel upwardly therethrough, a ring rotatable about said fire pot below the upper edge thereof, an endless conveyer carried by said ring and driven thereby for removing ashes discharged over the upper edge of said fire pot, and means for rotating said ring.

2. In an automatic stoker, a fire pot, means for feeding fuel upwardly therethrough, a ring rotatable about said fire pot below the upper edge thereof, means on said ring for receiving ashes discharged over the upper edge of said fire pot, an endless conveyer carried by said ring, and means for rotating said ring.

3. In a furnace structure having a fire pot mounted in an ash pit and extending upwardly therein, means for feeding fuel upwardly through said fire pot, a ring rotatable about said fire pot below the upper edge thereof, an ash conveyer tube extending outwardly from said ash pit, a return conveyer tube communicating with said ash pit, an endless conveyer passing through said tubes and driven by said ring for removing ashes from said ash pit through said ash conveyer tube, and means for rotating said ring.

4. In a furnace structure having a fire pot mounted in an ash pit and extending upwardly therein, means for feeding fuel upwardly through said fire pot, a ring rotatable about said fire pot below the upper edge thereof, an ash conveyer tube extending outwardly from said ash pit, a return conveyer tube communicating with said ash pit, an ash plate on said ring for receiving ashes discharged from the upper edge of said fire pot, a scraper for removing ashes from said plate adjacent said ash conveyer tube, an endless conveyer passing through said tubes and around said ring for removing ashes from said ash pit through said ash conveyer tube, and means for rotating said ring.

5. In an automatic stoker, a burner casing having the upper end thereof open, a fire pot closing the open end of said casing, means for feeding fuel upwardly through said fire pot, a ring rotatably mounted on said casing, an endless ash conveyer passing around said ring and driven thereby, and transmission means within said casing for rotating said ring.

6. In a furnace structure, a grate, means for delivering fuel to the center of said grate and discharging ashes over the outer edge thereof, a ring mounted for rotation around said grate below the outer edge thereof, an endless ash conveyer supported by said ring and driven thereby, and means for rotating said ring.

7. In an automatic stoker, a grate, feeding means for delivering fuel centrally of said grate and discharging ashes from the outer edge thereof, a ring rotatable about said grate below the outer edge thereof, an ash conveyer tube having its inlet end positioned adjacent and substantially tangentially to said ring, a return conveyer tube having its outlet end arranged substantially tangentially to said ring, an endless conveyer passing through said tubes and around said ring and driven by said ring, and means for driving said feeding means and said ring.

8. In an automatic stoker, a grate, feeding means for delivering fuel thereto and discharging ashes from the outer edge thereof, a ring rotatable about said grate, a pair of ash conveyer tubes having their inner ends supported adjacent said ring, a housing to which the outer ends of said tubes are connected, a sheave in said housing, an endless conveyer passing through said tubes and carried by said sheave and said ring and driven by said ring, and means for driving said feeding means and said ring.

9. In an automatic stoker, a grate, feeding means for delivering fuel thereto and discharging ashes from the outer edge thereof, a ring rotatable about said grate, a pair of ash conveyer tubes having their inner ends supported adjacent said ring, a housing to which the outer ends of said tubes are connected, a sheave in said housing, an endless conveyer passing through said tubes and carried by said sheave and said ring and driven by said ring, means for adjusting said housing on the outer ends of said tubes to tension said conveyer, and means for driving said feeding means and said ring.

10. In an automatic stoker, a grate, feeding means for delivering fuel thereto and discharging ashes from the outer edge thereof, a ring rotatable about said grate, a pair of ash conveyer tubes having their outer ends operatively connected together and their inner ends supported adjacent said ring, the outwardly extending tube having an upwardly inclined portion therein, an endless conveyer passing through said tubes and carried by and driven by said ring, an ash receiving pocket in the lower wall of said upwardly inclined portion, and means for driving said feeding means and said ring.

11. In a furnace, a stationary grate mounted therein, means for feeding fuel to the central portion of said grate and discharging ashes over the outer edge thereof, an annular ash receiving plate having its outer edge spaced from the wall of said furnace to permit the passage of ashes thereover and rotatable about said grate below the outer edge thereof for receiving ashes discharged over the outer edge of said grate and transporting the same to a predetermined location, means for removing ashes from said plate at said location, and means for rotating said plate.

12. In a furnace having a stationary fire pot mounted in an ash pit and extending upwardly therein, means for feeding fuel upwardly through said fire pot, an annular ash conveyer plate having its outer edge spaced from the wall of said furnace to permit the passage of ashes thereover and rotatable about said fire pot below the upper edge thereof for receiving ashes discharged over the outer edge of said fire pot and transporting the same to a predetermined location, an ash conveyer for removing ashes from said ash pit, and means for discharging ashes from said ash conveyer plate at said location into the path of said conveyer.

13. In a furnace structure, a stationary grate, feeding means for delivering fuel to the center of said grate and discharging ashes over the outer edge thereof, an annular plate having its outer edge spaced from the wall of the furnace to permit the passage of ashes thereover and mounted for rotation around said grate below the outer edge thereof for receiving ashes discharged from the outer edge of said grate and transporting the same to a predetermined location, a conveyer for removing ashes discharged from said plate, means for discharging ashes from said plate at said location for delivery to said conveyer, and means for driving said feeding means, said plate and said conveyer.

14. In a furnace structure, a burner casing having the upper end thereof open, a fire pot in the open end of said casing and spaced from the wall thereof to provide an air chamber, feeding means for delivering fuel through the wall of said casing upwardly through said fire pot, an annular ash conveyer plate having its outer edge spaced from the wall of the furnace to permit the passage of ashes thereover and rotatably mounted on said casing, a scraper for removing ashes from said plate, a driving shaft extending into said chamber, and means in said chamber for transmitting power from said driving shaft to said feeding means and said plate.

15. In an automatic stoker, a burner casing, having the upper end thereof open and an ash discharge opening in the lower end thereof, a perforated fire pot mounted in the open end of said casing and spaced from the wall thereof to provide an air chamber, feeding means for delivering fuel through the wall of said casing upwardly through said fire pot, an ash conveyer plate rotatably mounted on said casing, a scraper for removing ashes from said plate, a conveyer for removing ashes from said chamber through said discharge opening, driving means for said conveyer, and means within said chamber for transmitting power from said driving means to said feeding means and said ash conveyer plate.

16. In a furnace having an ash pit in the bottom thereof, a burner casing extending upwardly in said ash pit and having an ash discharge opening in the lower end thereof, a perforated fire pot closing the upper end of said casing and spaced from the wall thereof to provide an air chamber, feeding means for delivering fuel upwardly through said fire pot, a ring rotatable on said casing beneath the upper edge of said fire pot, an ash conveyer tube extending outwardly from said ash pit, a return conveyer tube communicating with said ash pit, an endless conveyer passing through said tubes and driven by said ring for removing ashes from said ash pit, a screw conveyer for removing ashes from said chamber through said opening, driving means for said screw conveyer, and means within said chamber for transmitting power from said driving means to said feeding means and said ring.

17. In an automatic stoker, a burner casing comprising a base section having an air inlet and an ash discharge opening therein and an upper section rotatably adjustable on said base section and having a fuel delivery opening therein, a fire pot supported on said upper section and having an opening therein connecting with said fuel delivery opening, a ring rotatably mounted on said upper section, an endless ash conveyer carried by said ring and driven thereby, conveyer means for feeding fuel through said fuel delivery opening upwardly through the opening in said fire pot, a driving shaft extending inwardly through said ash discharge opening, a screw conveyer on said driving shaft for removing ashes from said casing, and gearing within said casing for transmitting power from said driving shaft to said ring and said conveyer means.

18. In an automatic stoker, a burner casing comprising a base section having an air inlet and an ash discharge opening therein and an upper section rotatably adjustable on said base section and having a fuel delivery opening therein, a fire pot supported on said upper section and having an opening therein connecting with said fuel delivery opening, conveyer means for feeding fuel through said fuel delivery opening upwardly through the opening in said fire pot and rotatably adjustable with said upper section, a driving shaft extending inwardly through said ash discharge opening, a screw conveyer on said shaft for conveying ashes outwardly from said casing through said opening, and gearing within said casing for transmitting power from said drive shaft to said conveyer means in adjustable angular positions of said shaft with respect to said means.

19. In an automatic stoker, a burner casing, a grate supported centrally over said casing, feeding means arranged transversely of the axis of said casing for delivering fuel to the central portion of said grate, a drive shaft extending inwardly through said casing transversely of the axis thereof and angularly adjustable around said axis relatively to said feeding means, and mechanism within said casing for transmitting power from said drive shaft to said feeding means in adjustable angular positions of said shaft with respect to said means.

20. In an automatic stoker, a burner, a conveyer for delivering fuel to said burner in a direction transversely to the axis thereof, a driving shaft positioned transversely of the axis of said burner and angularly adjustable around said axis relatively to said conveyer, and power transmitting means between said driving shaft and said conveyer so constructed and arranged that said driving shaft and said conveyer may be rotatably adjusted independently of each other about said axis.

21. In an automatic stoker, a burner, a screw conveyer for delivering fuel to said burner in a direction transversely of the axis thereof and movable into different angular positions around said axis, a driving shaft positioned transversely of the axis of said burner and movable independently of said screw conveyer into different angular positions around said axis, an endless ash conveyer passing around said burner, and power transmitting means connecting said driving shaft with said screw conveyer and said endless conveyer for actuating said conveyers in different angular adjustments of said driving shaft and said screw conveyer around said axis.

22. In an automatic stoker, a burner casing, a grate mounted in the upper end thereof, means for feeding fuel to the center of said grate and discharging ashes over the edge of said grate and said burner casing, a ring rotatably mounted on said casing below the upper edge thereof, an ash receiving and conveying plate carried by said ring, an internal gear on said ring, a stub shaft extending through the wall of said casing and having a spur gear on the outer end thereof for engagement with said internal gear to rotate said ring, and means within said casing for transmitting power to said stub shaft.

23. In an automatic stoker, a burner casing, a fire pot mounted in the upper end thereof, a fuel feed pipe extending transversely into said casing and connected to the lower end of said fire pot, a spiral fuel conveyer in said feed pipe and having the shaft thereof extending through the wall of said pipe, a ring rotatably mounted on said casing below the upper edge thereof, an ash conveyer plate carried by said ring, an internal gear on said ring, a stub shaft supported in the wall of said casing and having a spur gear thereon in engagement with said internal gear to rotate said ring, a power shaft extending into said casing, and gearing within said casing to transmit power to said spiral conveyer shaft and said stub shaft.

24. In a furnace structure, a burner casing comprising a base section having an air inlet therein and an upper section rotatably adjustable on said base section and having a fuel delivery opening therein, and a fire pot supported on said upper section and having an opening therein connecting with said fuel delivery opening.

25. In a furnace structure, a burner casing comprising a base section having a drive shaft opening in the side wall thereof and an upper section rotatably adjustable on said base section and having a fuel delivery opening in the side wall thereof, and a fire pot supported on said upper section and having an opening therein connecting with said fuel delivery opening.

26. In a furnace structure, a burner casing comprising a base section having an opening for a drive shaft in the side wall thereof and an upper section rotatably adjustable on said base section and having a fuel delivery opening in the side wall thereof, a fire pot supported on said upper section and having an opening therein connecting with said fuel delivery opening, a bearing on said upper section, and a conveyer drive supported by said bearing for rotation around said upper section.

27. In a furnace structure, a burner casing comprising a base section having an opening for a drive shaft in the side wall thereof and an upper section rotatably adjustable on said base section and having a fuel delivery opening in the side wall thereof, a fire pot supported on said upper section and having an opening therein connecting with said fuel delivery opening, a bearing on said upper section, a ring supported by said bearing for rotation around said upper section, and means on said ring for receiving ashes discharged over the outer edge of said fire pot.

28. In a furnace structure, a burner casing comprising a base section and an upper section rotatably adjustable on said base section and having an overhanging rim on the upper end thereof, a fire pot closing the upper end of said casing, a rotatable ring mounted on said casing below said rim for driving an endless ash conveyer, and means for rotating said ring.

29. In a furnace structure, a burner casing comprising a base section, an intermediate section rotatably adjustable on said base section and a top section secured on said intermediate section and having an outwardly projecting rim thereon, a bearing on said intermediate and top sections below said rim, a ring supported by said bearing for rotation around said casing, an ash conveyer carried by said ring, and a grate in said casing for delivering ashes over its edge to said conveyer.

30. In an automatic stoker, a burner casing having the upper end thereof open and an opening near the bottom thereof for the removal of ashes, a perforated fire pot mounted in the open end of said casing, a fuel conveyer tube extending inwardly through the wall of said casing to deliver fuel upwardly through said fire pot, a spiral fuel conveyer in said tube, a shaft for said spiral fuel conveyer having one end thereof extending through the wall of said tube into said casing, a gear wheel mounted in the bottom of said casing for rotation about the axis of said casing, a drive shaft extending through the opening in said casing, a spiral ash conveyer on said drive shaft to convey ashes from said casing through the said opening, a scraper on said gear wheel to convey ashes to said spiral ash conveyer, and means for transmitting power from said drive shaft to said gear wheel and from said gear wheel to the shaft for said fuel conveyer.

31. In an automatic stoker having a burner casing and a grate supported thereon, means for removing ashes from said casing through an opening near the bottom thereof comprising a spiral conveyer extending through said opening and supported for rotation therein, a scraper rotatably mounted in said casing to convey ashes to said opening, means adjacent said opening for positively actuating said scraper to discharge ashes conveyed thereby, and means for rotating said conveyer and said scraper.

32. In an automatic stoker having a burner casing and a grate supported thereon, means for removing ashes from said casing through an opening in the bottom thereof comprising a spiral conveyer extending through said opening, a pivoted scraper rotatably mounted in said casing for conveying ashes to said conveyer, a bearing for said conveyer in the path of movement of said scraper and pivotally actuating the same to discharge ashes conveyed thereby, and means for rotating said conveyer and said scraper.

33. In an automatic stoker, a fire pot having a fuel delivery opening in the bottom thereof, a fuel conveyer pipe connected to said opening, a bearing mounted in the wall of said pipe in alinement with the longitudinal opening through said pipe, a stub shaft supported in said bearing, a collar secured on one end of said stub shaft and projecting into said pipe, a driving gear on the opposite end of said stub shaft, a thrust bearing between said driving gear and said pipe, a spiral conveyer in said pipe, and means for detachably connecting said spiral conveyer to said collar.

34. In an automatic stoker, a fire pot having a fuel delivery opening in the bottom thereof, a fuel conveyer pipe connected to said opening, a bearing secured in the wall of said pipe in alinement with the opening through said pipe, a stub shaft mounted in said bearing, a collar secured on one end of said stub shaft and projecting into said pipe, means on said collar for feeding fuel away from said bearing, a driving gear on the opposite end of said stub shaft, a thrust bearing between said driving gear and said pipe, a spiral conveyer in said pipe, and means for detachably connecting said spiral conveyer to said collar.

35. In an automatic stoker, a burner casing having an air inlet opening and a drive shaft opening therein, a grate supported on said casing and spaced therefrom to provide an air chamber, feeding means for delivering fuel upwardly through said grate, a bearing in said casing in alinement with said drive shaft opening, a stub shaft supported by said bearing, power transmitting means between said stub shaft and said feeding means, a blower having a rigid air delivery pipe extending therefrom and secured to said air inlet opening, motor mechanism rigidly attached to said blower and movable therewith, and a rigid drive shaft having one end flexibly connected to said motor mechanism and the opposite end flexibly connected to said stub shaft.

36. In an automatic stoker, the combination of a burner, feeding means for delivering fuel to said burner, power transmitting mechanism within said burner for actuating said feeding means, motor mechanism spaced from said burner and rigidly secured thereto, a drive shaft having one end flexibly connected to said power transmitting mechanism and its opposite end connected to said motor mechanism, and a universal bearing on said motor mechanism for supporting the last mentioned end of said drive shaft.

37. In an automatic stoker, a burner, power transmitting means encased in said burner for actuating the moving parts of said stoker, a blower, an air pipe rigidly connecting said blower to one side of said burner, motor mechanism secured to said blower, a stay rod extending between the opposite side of said burner and said motor mechanism, a universal bearing on said motor mechanism, and a drive shaft having one end supported in said bearing and in driving connection with said motor mechanism and its opposite end flexibly connected to said power transmitting means.

38. In an automatic stoker, a burner, power transmitting means therein, a rigid pipe for delivering air to said burner, a blower spaced from said burner and rigidly connected thereto by said pipe, a support for said blower, a motor rigidly mounted on said support for operating said blower and said stoker, a universal bearing mounted on said support, a drive shaft having one end supported in said bearing and the opposite end flexibly connected to said power transmitting means, and means for transmitting power from said motor to said drive shaft and to said blower.

39. In an automatic stoker, a burner, feeding means for delivering fuel thereto, a conveyer for removing ashes discharged therefrom, power transmitting mechanism within said burner for actuating said feeding means and said conveyer, a blower rigidly connected to said burner, motor mechanism rigidly attached to said blower, and a rigid drive shaft having one end flexibly connected to said motor mechanism and the opposite end flexibly connected to said power transmitting mechanism.

40. In an automatic stoker, a burner, feeding means for delivering fuel thereto, a conveyer for removing ashes discharged therefrom, power transmitting mechanism within said burner for actuating said feeding means and said conveyer, motor mechanism rigidly secured to said burner, and a rigid drive shaft having one end flexibly connected to said motor mechanism and the opposite end flexibly connected to said power transmitting mechanism.

GEORGE H. CROCKER.